United States Patent
Derelöv (10) Patent No.: US 10,669,716 B2
(45) Date of Patent: *Jun. 2, 2020

(54) PANELS COMPRISING A MECHANICAL LOCKING DEVICE AND AN ASSEMBLED PRODUCT COMPRISING THE PANELS

(71) Applicant: VÄLINGE INNOVATION AB, Viken (SE)

(72) Inventor: Peter Derelöv, Helsingborg (SE)

(73) Assignee: VALINGE INNOVATION AB, Viken (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/923,701

(22) Filed: Mar. 16, 2018

(65) Prior Publication Data

US 2018/0202160 A1    Jul. 19, 2018

Related U.S. Application Data

(63) Continuation of application No. 15/366,704, filed on Dec. 1, 2016, now Pat. No. 9,945,121.

(30) Foreign Application Priority Data

Dec. 3, 2015  (SE) ........................................ 1551591

(51) Int. Cl.
  *E04C 2/38*  (2006.01)
  *F16B 12/46*  (2006.01)
  (Continued)

(52) U.S. Cl.
  CPC ................ *E04C 2/38* (2013.01); *A47B 47/04* (2013.01); *A47B 47/042* (2013.01); *E04C 2/40* (2013.01);
  (Continued)

(58) Field of Classification Search
  CPC .................................... E04C 2/38; E04C 2/40
  See application file for complete search history.

(56) References Cited

U.S. PATENT DOCUMENTS 291,032 A    1/1884  Cleland
634,581 A   10/1899  Miller
(Continued)

FOREIGN PATENT DOCUMENTS

CH         365 507 A    11/1962
CH         685 276 A5    5/1995
(Continued)

OTHER PUBLICATIONS

U.S. Appl. No. 15/956,949, Derelöv.
(Continued)

*Primary Examiner* — Patrick J Maestri
(74) *Attorney, Agent, or Firm* — Buchanan Ingersoll & Rooney P.C.

(57) ABSTRACT

A set of panels including a first panel, a second, and a locking device. The locking device includes an edge groove at the first edge and a tongue groove at the second edge. The edge groove includes a flexible tongue arranged in an insertion groove at a first side of the edge groove. The edge groove includes a first groove surface at a first side of the insertion groove and a second groove surface at a second side of the insertion groove. The second edge includes a first edge surface at a first side of the tongue groove and a second edge surface at a second side of the tongue groove. The locking device is configured to be unlocked by inserting a tool in the tongue groove. The first groove surface is arranged offset in a second direction relative to the second groove surface by a first distance.

4 Claims, 9 Drawing Sheets

(51) Int. Cl.
  *A47B 47/04*    (2006.01)
  *F16B 12/12*    (2006.01)
  *F16B 12/44*    (2006.01)
  *F16B 12/26*    (2006.01)
  *F16B 12/24*    (2006.01)
  *E04C 2/40*     (2006.01)

(52) U.S. Cl.
  CPC .......... *F16B 12/125* (2013.01); *F16B 12/24* (2013.01); *F16B 12/26* (2013.01); *F16B 12/44* (2013.01); *F16B 12/46* (2013.01); *A47B 2230/0081* (2013.01); *A47B 2230/0096* (2013.01)

(56) References Cited

U.S. PATENT DOCUMENTS

| | | | |
|---|---|---|---|
| 701,000 A | 5/1902 | Ahrens | |
| 861,911 A | 7/1907 | Stewart | |
| 881,673 A | 3/1908 | Ellison | |
| 1,533,099 A | 4/1925 | Carroll | |
| 1,534,468 A | 4/1925 | Shea, Jr. | |
| 1,800,386 A | 4/1931 | Hoffman | |
| 1,800,387 A | 4/1931 | Greist | |
| 1,802,245 A | 4/1931 | Foretich | |
| 1,954,242 A | 4/1934 | Heppenstall | |
| 2,360,451 A | 10/1944 | Stone | |
| 2,362,904 A | 11/1944 | Kramer | |
| 2,496,184 A | 1/1950 | Von Canon | |
| 2,681,483 A | 6/1954 | Morawetz | |
| 3,002,630 A | 10/1961 | Heisser | |
| 3,195,968 A | 7/1965 | Freeman | |
| 3,284,152 A | 11/1966 | Schörghuber | |
| 3,313,054 A | 4/1967 | Madey | |
| 3,347,610 A | 10/1967 | Pilliod | |
| 3,410,441 A | 11/1968 | Rhyne | |
| 3,722,704 A | 3/1973 | Piretti | |
| 3,722,971 A | 3/1973 | Zeischegg | |
| 3,742,807 A | 7/1973 | Manning | |
| 3,765,465 A | 10/1973 | Gulistan | |
| 3,784,271 A | 1/1974 | Schreiber | |
| 3,884,002 A | 5/1975 | Logie | |
| 3,885,845 A | 5/1975 | Krieks | |
| 3,981,118 A | 9/1976 | Johnson et al. | |
| 4,089,614 A | 5/1978 | Harley | |
| 4,099,887 A | 7/1978 | Mackenroth | |
| 4,116,510 A | 9/1978 | Franco | |
| 4,142,271 A | 3/1979 | Busse | |
| 4,211,379 A | 7/1980 | Morgan et al. | |
| 4,222,544 A | 9/1980 | Crowder | |
| 4,279,397 A | 7/1981 | Larsson | |
| 4,299,067 A | 11/1981 | Bertschi | |
| 4,308,961 A | 1/1982 | Kunce | |
| 4,324,517 A | 4/1982 | Dey | |
| 4,403,886 A | 9/1983 | Haeusler | |
| 4,405,253 A | 9/1983 | Stockum | |
| 4,509,648 A | 4/1985 | Govang | |
| 4,593,734 A | 6/1986 | Wallace | |
| 4,595,105 A | 6/1986 | Gold | |
| 4,597,122 A | 7/1986 | Handler | |
| 4,615,448 A | 10/1986 | Johnstonbaugh | |
| 4,629,076 A | 12/1986 | Amstutz et al. | |
| 4,750,794 A | 6/1988 | Vegh | |
| 4,752,150 A | 6/1988 | Salice | |
| 4,815,908 A | 3/1989 | Duran et al. | |
| 4,817,900 A | 4/1989 | Whittington | |
| 4,844,266 A | 7/1989 | Small | |
| 4,883,331 A | 11/1989 | Mengel | |
| 4,886,326 A | 12/1989 | Kuzyk | |
| 4,888,933 A | 12/1989 | Guomundsson | |
| 4,891,897 A | 1/1990 | Gieske et al. | |
| 4,909,581 A | 3/1990 | Haheeb | |
| 4,938,625 A | 7/1990 | Matsui | |
| 4,944,416 A | 7/1990 | Petersen et al. | |
| 4,961,295 A | 10/1990 | Kosch, Sr. et al. | |
| 5,004,116 A | 4/1991 | Cattarozzi | |
| 5,018,323 A | 5/1991 | Clausen | |
| 5,109,993 A | 5/1992 | Hutchison | |
| 5,114,265 A | 5/1992 | Grisley | |
| 5,121,578 A | 6/1992 | Holz | |
| 5,125,518 A | 6/1992 | Ward | |
| 5,138,803 A | 8/1992 | Grossen | |
| 5,209,556 A | 5/1993 | Anderson | |
| 5,212,925 A | 5/1993 | McClinton | |
| 5,360,121 A | 11/1994 | Sothman | |
| 5,375,802 A | 12/1994 | Branham, II | |
| 5,423,155 A | 6/1995 | Bauer | |
| 5,451,102 A | 9/1995 | Chuan | |
| 5,458,433 A * | 10/1995 | Stastny .................. | B27F 5/02 144/136.95 |
| 5,471,804 A | 12/1995 | Winter, IV | |
| 5,475,960 A | 12/1995 | Lindal | |
| 5,499,667 A | 3/1996 | Nakanishi | |
| 5,499,886 A | 3/1996 | Short et al. | |
| 5,507,331 A | 4/1996 | Nakanishi | |
| 5,527,103 A | 6/1996 | Pittman | |
| 5,658,086 A | 8/1997 | Brokaw et al. | |
| 5,711,115 A | 1/1998 | Wirt | |
| 5,775,521 A | 7/1998 | Tisbo | |
| 5,810,505 A | 9/1998 | Henriott | |
| 5,893,617 A | 4/1999 | Lee | |
| 5,941,026 A | 8/1999 | Eisenreich | |
| 5,944,294 A | 8/1999 | Baer | |
| 5,950,389 A | 9/1999 | Porter | |
| 6,045,290 A | 4/2000 | Nocievski | |
| 6,050,426 A | 4/2000 | Leurdijk | |
| 6,142,436 A | 11/2000 | Thurston et al. | |
| 6,312,186 B1 | 11/2001 | Röck et al. | |
| 6,363,645 B1 | 4/2002 | Hunter | |
| 6,413,007 B1 | 7/2002 | Lambright | |
| 6,418,683 B1 | 7/2002 | Martensson | |
| 6,491,172 B2 | 12/2002 | Chance | |
| 6,505,452 B1 | 1/2003 | Hannig | |
| 6,547,086 B1 | 4/2003 | Harvey | |
| 6,578,498 B1 | 6/2003 | Draudt et al. | |
| 6,675,979 B2 | 1/2004 | Taylor | |
| D486,676 S | 2/2004 | Campbell et al. | |
| 6,769,219 B2 | 8/2004 | Schwitte et al. | |
| 6,772,890 B2 | 8/2004 | Campbell et al. | |
| 6,827,028 B1 | 12/2004 | Callaway | |
| 6,971,614 B2 | 12/2005 | Fischer et al. | |
| 7,127,860 B2 | 10/2006 | Pervan | |
| 7,223,045 B2 | 5/2007 | Migli | |
| 7,228,977 B2 | 6/2007 | Perkins et al. | |
| 7,300,120 B2 | 11/2007 | Shin | |
| 7,451,535 B2 | 11/2008 | Wells et al. | |
| 7,451,578 B2 | 11/2008 | Hannig | |
| 7,584,583 B2 | 9/2009 | Bergelin et al. | |
| 7,614,350 B2 | 11/2009 | Tuttle et al. | |
| 7,621,092 B2 | 11/2009 | Groeke et al. | |
| 7,641,414 B1 | 1/2010 | Joyce | |
| 7,717,278 B2 | 5/2010 | Kao | |
| 7,721,503 B2 | 5/2010 | Pervan et al. | |
| 7,793,450 B2 | 9/2010 | Chasmer et al. | |
| 7,818,939 B2 | 10/2010 | Bearinger | |
| 7,998,549 B2 | 8/2011 | Susnjara | |
| 8,033,074 B2 | 10/2011 | Pervan | |
| 8,038,363 B2 | 10/2011 | Hannig | |
| 8,042,311 B2 | 10/2011 | Pervan | |
| 8,146,754 B2 | 4/2012 | Apgood | |
| 8,220,217 B2 | 7/2012 | Muehlebach | |
| 8,234,830 B2 | 8/2012 | Pervan | |
| 8,365,499 B2 | 2/2013 | Nilsson et al. | |
| 8,387,327 B2 | 3/2013 | Pervan | |
| 8,464,408 B2 | 6/2013 | Hazzard | |
| 8,495,849 B2 | 7/2013 | Pervan | |
| 8,505,257 B2 | 8/2013 | Boo et al. | |
| 8,544,230 B2 | 10/2013 | Pervan | |
| 8,596,013 B2 | 12/2013 | Boo | |
| 8,602,227 B1 | 12/2013 | McDonald | |
| 8,615,952 B2 | 12/2013 | Engström | |
| 8,713,886 B2 | 5/2014 | Pervan | |
| 8,745,952 B2 | 6/2014 | Perra | |
| 8,764,137 B2 | 7/2014 | Fehre | |

(56) References Cited

U.S. PATENT DOCUMENTS

| | | | |
|---|---|---|---|
| 8,776,473 | B2 | 7/2014 | Pervan |
| 8,833,028 | B2 | 9/2014 | Whispell et al. |
| 8,864,407 | B1 | 10/2014 | Sorum |
| 8,882,416 | B2 | 11/2014 | Baur et al. |
| 8,887,468 | B2 | 11/2014 | Håkansson et al. |
| 9,175,703 | B2 | 11/2015 | Maertens |
| 9,216,541 | B2 | 12/2015 | Boo |
| 9,290,948 | B2 | 3/2016 | Cappelle et al. |
| 9,375,085 | B2 | 6/2016 | Derelöv |
| 9,538,842 | B2 | 1/2017 | Håkansson et al. |
| 9,655,442 | B2 | 5/2017 | Boo et al. |
| 9,700,157 | B2 | 7/2017 | Keyvanloo |
| 9,714,672 | B2 | 7/2017 | Derelöv et al. |
| 9,723,923 | B2 | 8/2017 | Derelöv |
| 9,726,210 | B2 | 8/2017 | Derelöv et al. |
| 9,745,756 | B2 | 8/2017 | Hannig |
| 9,758,973 | B2 | 9/2017 | Segaert |
| 9,763,528 | B2 | 9/2017 | Lung |
| 9,809,983 | B2 | 11/2017 | Trudel |
| 9,945,121 | B2 | 4/2018 | Derelöv |
| 10,034,541 | B2 | 7/2018 | Boo et al. |
| 10,202,996 | B2 | 2/2019 | Håkansson et al. |
| 10,378,570 | B2 | 8/2019 | Broughton |
| 10,415,613 | B2 | 9/2019 | Boo |
| 10,448,739 | B2 | 10/2019 | Derelöv et al. |
| 10,451,097 | B2 | 10/2019 | Brännström et al. |
| 2002/0170258 | A1 | 11/2002 | Schwitte et al. |
| 2004/0165946 | A1 | 8/2004 | Areh et al. |
| 2005/0042027 | A1 | 2/2005 | Migli |
| 2005/0236544 | A1 | 10/2005 | Mancino |
| 2005/0247653 | A1 | 11/2005 | Brooks |
| 2006/0091093 | A1 | 5/2006 | Armari |
| 2006/0101769 | A1 | 5/2006 | Pervan et al. |
| 2006/0180561 | A1 | 8/2006 | Wisnoski et al. |
| 2006/0236642 | A1 | 10/2006 | Pervan |
| 2006/0273085 | A1 | 12/2006 | Casto |
| 2007/0006543 | A1 | 1/2007 | Engström |
| 2007/0028547 | A1 | 2/2007 | Grafenauer et al. |
| 2008/0010937 | A1 | 1/2008 | Pervan et al. |
| 2008/0066415 | A1 | 3/2008 | Pervan |
| 2008/0193209 | A1 | 8/2008 | Henderson |
| 2008/0216435 | A1 | 9/2008 | Nolan |
| 2008/0236088 | A1 | 10/2008 | Hannig et al. |
| 2009/0014401 | A1 | 1/2009 | Tallman |
| 2009/0064624 | A1 | 3/2009 | Sokol |
| 2010/0028592 | A1 | 2/2010 | Barkdoll et al. |
| 2010/0083603 | A1 | 4/2010 | Goodwin |
| 2010/0104354 | A1 | 4/2010 | Spalding |
| 2010/0173122 | A1 | 7/2010 | Susnjara |
| 2010/0289389 | A1 | 11/2010 | Crabtree, II |
| 2011/0023303 | A1 | 2/2011 | Pervan et al. |
| 2011/0225921 | A1 | 9/2011 | Schulte |
| 2011/0225922 | A1 | 9/2011 | Pervan et al. |
| 2011/0280655 | A1 | 11/2011 | Maertens et al. |
| 2011/0283650 | A1 | 11/2011 | Pervan et al. |
| 2012/0009383 | A1 | 1/2012 | Hardesty |
| 2012/0027967 | A1 | 2/2012 | Maertens et al. |
| 2012/0073235 | A1 | 3/2012 | Hannig |
| 2012/0124932 | A1 | 5/2012 | Schulte et al. |
| 2012/0145845 | A1 | 6/2012 | Hightower |
| 2012/0180416 | A1 | 7/2012 | Perra et al. |
| 2012/0279161 | A1* | 11/2012 | Hakansson ........ A47B 47/0075 52/588.1 |
| 2012/0286637 | A1 | 11/2012 | Fehre |
| 2013/0014463 | A1 | 1/2013 | Pervan |
| 2013/0048632 | A1 | 2/2013 | Chen |
| 2013/0071172 | A1 | 3/2013 | Maertens et al. |
| 2013/0081349 | A1 | 4/2013 | Pervan |
| 2013/0097846 | A1 | 4/2013 | Pettigrew |
| 2013/0111845 | A1 | 5/2013 | Pervan |
| 2013/0170904 | A1 | 7/2013 | Cappelle et al. |
| 2013/0232905 | A2 | 9/2013 | Pervan |
| 2013/0287484 | A1 | 10/2013 | Phillips |
| 2014/0013919 | A1 | 1/2014 | Gerke et al. |
| 2014/0055018 | A1 | 2/2014 | Shein et al. |
| 2014/0111076 | A1 | 4/2014 | Devos |
| 2014/0286701 | A1 | 9/2014 | Sauer |
| 2014/0294498 | A1 | 10/2014 | Logan |
| 2015/0034522 | A1 | 2/2015 | Itou et al. |
| 2015/0035422 | A1 | 2/2015 | Håkansson et al. |
| 2015/0078807 | A1 | 3/2015 | Brännström et al. |
| 2015/0078819 | A1 | 3/2015 | Derelöv et al. |
| 2015/0196118 | A1 | 7/2015 | Derelöv |
| 2015/0198191 | A1 | 7/2015 | Boo |
| 2015/0230600 | A1 | 8/2015 | Schulte |
| 2015/0368896 | A1 | 12/2015 | Schulte |
| 2016/0000220 | A1 | 1/2016 | Devos |
| 2016/0007751 | A1 | 1/2016 | Derelöv |
| 2016/0145029 | A1 | 5/2016 | Ranade et al. |
| 2016/0174704 | A1 | 6/2016 | Boo et al. |
| 2016/0186925 | A1 | 6/2016 | Bettin |
| 2016/0192775 | A1 | 7/2016 | Andersson |
| 2016/0270531 | A1 | 9/2016 | Derelöv |
| 2017/0079433 | A1 | 3/2017 | Derelöv et al. |
| 2017/0089379 | A1 | 3/2017 | Pervan |
| 2017/0097033 | A1 | 4/2017 | Håkansson et al. |
| 2017/0159291 | A1 | 6/2017 | Derelöv |
| 2017/0208938 | A1 | 7/2017 | Derelöv et al. |
| 2017/0227031 | A1 | 8/2017 | Boo |
| 2017/0227032 | A1 | 8/2017 | Fridlund |
| 2017/0227035 | A1 | 8/2017 | Fridlund |
| 2017/0234346 | A1 | 8/2017 | Fridlund |
| 2017/0298973 | A1 | 10/2017 | Derelöv |
| 2017/0360193 | A1 | 12/2017 | Boo et al. |
| 2018/0080488 | A1 | 3/2018 | Derelöv |
| 2018/0087552 | A1 | 3/2018 | Derelöv et al. |
| 2018/0112695 | A1 | 4/2018 | Boo et al. |
| 2018/0119717 | A1 | 5/2018 | Derelöv |
| 2018/0283430 | A1 | 10/2018 | Leistert |
| 2018/0328396 | A1 | 11/2018 | Fransson et al. |
| 2019/0113061 | A1 | 4/2019 | Håkansson et al. |
| 2019/0166989 | A1 | 6/2019 | Boo et al. |
| 2019/0191870 | A1 | 6/2019 | Derelöv |
| 2019/0195256 | A1 | 6/2019 | Derelöv |
| 2019/0289999 | A1 | 9/2019 | Derelöv et al. |
| 2019/0320793 | A1 | 10/2019 | Boo |
| 2019/0323532 | A1 | 10/2019 | Boo |
| 2019/0323533 | A1 | 10/2019 | Boo |
| 2019/0323534 | A1 | 10/2019 | Derelöv |
| 2019/0323535 | A1 | 10/2019 | Derelöv |
| 2020/0003242 | A1 | 1/2020 | Brännström et al. |

FOREIGN PATENT DOCUMENTS

| | | |
|---|---|---|
| CH | 696 889 A5 | 1/2008 |
| CH | 698 988 B1 | 12/2009 |
| CH | 705 082 A2 | 12/2012 |
| CN | 101099618 A | 1/2008 |
| CN | 102 917 616 A | 2/2013 |
| CN | 203424576 U | 2/2014 |
| DE | 31 03 281 A1 | 8/1982 |
| DE | 228 872 A1 | 10/1985 |
| DE | 42 29 115 A1 | 3/1993 |
| DE | 94 17 168 U1 | 2/1995 |
| DE | 198 31 936 A1 | 2/1999 |
| DE | 298 20 031 U1 | 2/1999 |
| DE | 198 05 538 A1 | 8/1999 |
| DE | 203 04 761 U1 | 4/2004 |
| DE | 299 24 630 U1 | 5/2004 |
| DE | 20 2004 017 486 U1 | 4/2006 |
| DE | 20 2009 008 825 U1 | 10/2009 |
| DE | 10 2008 035 293 A1 | 2/2010 |
| DE | 10 2009 041 142 A1 | 3/2011 |
| DE | 10 2011 057 018 A1 | 6/2013 |
| DE | 10 2013 008 595 A1 | 11/2013 |
| DE | 10 2014 110 124 A1 | 1/2016 |
| DE | 20 2017 101 856 U1 | 4/2017 |
| EP | 0 060 203 A2 | 9/1982 |
| EP | 0 060 203 A3 | 9/1982 |
| EP | 0 357 129 A1 | 3/1990 |
| EP | 0 362 968 A | 4/1990 |
| EP | 0 675 332 A2 | 10/1995 |
| EP | 0 871 156 A2 | 10/1998 |
| EP | 1 048 423 A2 | 11/2000 |

(56) References Cited

FOREIGN PATENT DOCUMENTS

| | | |
|---|---|---|
| EP | 1 048 423 B9 | 5/2005 |
| EP | 1 650 375 A1 | 4/2006 |
| EP | 1 671 562 A1 | 6/2006 |
| EP | 1 650 375 A8 | 9/2006 |
| EP | 1 922 954 A1 | 5/2008 |
| EP | 2 017 403 A2 | 1/2009 |
| EP | 1 922 954 B1 | 7/2009 |
| EP | 2 333 353 A2 | 6/2011 |
| EP | 1 863 984 B1 | 11/2011 |
| EP | 2 487 373 A1 | 8/2012 |
| EP | 3 031 998 A1 | 6/2016 |
| FR | 2 517 187 A1 | 6/1983 |
| FR | 2 597 173 A1 | 10/1987 |
| FR | 2 602 013 A1 | 1/1988 |
| GB | 1 022 377 A | 3/1966 |
| GB | 2 163 825 A | 3/1986 |
| GB | 2 482 213 A | 1/2012 |
| GB | 2 520 927 A | 6/2015 |
| JP | S53-113160 U | 9/1978 |
| JP | 2003-239921 A | 8/2003 |
| KR | 10-1147274 B1 | 5/2012 |
| KR | 2014-0042314 A | 4/2014 |
| WO | WO 87/07339 A1 | 12/1987 |
| WO | WO 90/07066 | 6/1990 |
| WO | WO 99/22150 A1 | 5/1999 |
| WO | WO 99/41508 A2 | 8/1999 |
| WO | WO 00/66856 A1 | 11/2000 |
| WO | WO 01/53628 A1 | 7/2001 |
| WO | WO 02/055809 A1 | 7/2002 |
| WO | WO 02/055810 A1 | 7/2002 |
| WO | WO 03/083234 A1 | 10/2003 |
| WO | WO 2004/079130 A1 | 9/2004 |
| WO | WO 2005/068747 A1 | 7/2005 |
| WO | WO 2006/043893 A1 | 4/2006 |
| WO | WO 2006/104436 A1 | 10/2006 |
| WO | WO 2007/015669 A2 | 2/2007 |
| WO | WO 2007/015669 A3 | 2/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/017281 A1 | 2/2008 |
| WO | WO 2008/150234 A1 | 12/2008 |
| WO | WO-2010070472 A2 * 6/2010 ........... A47B 47/042 |
| WO | WO 2010/087752 A1 | 8/2010 |
| WO | WO 2011/151758 A2 | 12/2011 |
| WO | WO 2011/151758 A3 | 12/2011 |
| WO | WO 2012/095454 A1 | 7/2012 |
| WO | WO 2012/154113 A1 | 11/2012 |
| WO | WO 2013/009257 A1 | 1/2013 |
| WO | WO 2013/025163 A1 | 2/2013 |
| WO | WO 2013/080160 A1 | 6/2013 |
| WO | WO 2013/118075 A1 | 8/2013 |
| WO | WO 2014/072080 A1 | 5/2014 |
| WO | WO 2014/121410 A1 | 8/2014 |
| WO | WO 2015/015603 A1 | 2/2015 |
| WO | WO 2015/038059 A1 | 3/2015 |
| WO | WO 2015/105449 A1 | 7/2015 |
| WO | WO 2015/105450 A1 | 7/2015 |
| WO | WO 2015/105451 A1 | 7/2015 |
| WO | WO 2016/099396 A1 | 6/2016 |
| WO | WO 2016/175701 A1 | 11/2016 |
| WO | WO 2017/131574 A1 | 8/2017 |
| WO | WO 2017/138874 A1 | 8/2017 |
| WO | WO 2018/080387 A1 | 5/2018 |
| WO | WO 2019/125291 A1 | 6/2019 |
| WO | WO 2019/125292 A1 | 6/2019 |

OTHER PUBLICATIONS

U.S. Appl. No. 16/027,479, Boo, et al.
U.S. Appl. No. 16/220,574, Derelöv.
U.S. Appl. No. 16/220,585, Derelöv.
U.S. Appl. No. 16/361,609, Derelöv et al.
U.S. Appl. No. 16/386,732, Boo.
U.S. Appl. No. 16/386,810, Boo.
U.S. Appl. No. 16/386,824, Boo.
U.S. Appl. No. 16/386,874, Derelöv.
International Search Report/Written Opinion dated Feb. 21, 2017 in PCT/SE2016/051197, ISA/SE, Patent-och registreringsverket, Stockholm, Sweden,18 pages.
Extended European Search Report issued in EP Application No. 16871156.2, dated Mar. 21, 2019, European Patent Office, Munich, DE, 8 pages.
Derelöv, Peter, U.S. Appl. No. 15/956,949 entitled "Panels for an Assembled Product", filed Apr. 19, 2018.
Boo, Christian, et al., U.S. Appl. No. 16/027,479 entitled "Panels Comprising a Mechanical Locking Device and an Assembled Product Comprising the Panels," filed Jul. 5, 2018.
Derelöv, Peter, U.S. Appl. No. 16/220,574 entitled "Set of Panels," filed Dec. 14, 2018.
Derelöv, Peter, U.S. Appl. No. 16/220,585 entitled "Set of Panels," filed Dec. 14, 2018.
Derelöv, Peter, et al., U.S. Appl. No. 16/361,609 entitled "Panels Comprising a Mechanical Locking Device and an Assembled Product Comprising the Panels," filed Mar. 22, 2019.
Boo, Christian, U.S. Appl. No. 16/386,732 entitled "Set of Panels With a Mechanical Locking Device," filed Apr. 17, 2019.
Boo, Christian, U.S. Appl. No. 16/386,810 entitled "Set of Panels With a Mechanical Locking Device," filed Apr. 17, 2019.
Boo, Christian, U.S. Appl. No. 16/386,824 entitled "Set of Panels With a Mechanical Locking Device," filed Apr. 17, 2019.
Derelöv, Peter, U.S. Appl. No. 16/386,874 entitled "Symmetric Tongue and T-Cross," filed Apr. 17, 2019.
U.S. Appl. No. 16/553,325, Derelöv et al.
U.S. Appl. No. 16/553,350, Derelöv et al.
U.S. Appl. No. 16/564,438, Brännström et al.
U.S. Appl. No. 16/567,436, Derelöv.
U.S. Appl. No. 16/663,603, Fridlund.
U.S. Appl. No. 16/697,335, Boo et al.
Derelöv, Peter, U.S. Appl. No. 16/553,325 entitled "Set of Panels with a Mechanical Locking Device," filed Aug. 28, 2019.
Derelöv, Peter, U.S. Appl. No. 16/553,350 entitled "Set of Panels with a Mechanical Locking Device," filed Aug. 28, 2019.
Brännström, Hans, et al., U.S. Appl. No. 16/564,438 entitled "Assembled Product and a Method of Assembling the Assembled Product," filed Sep. 9, 2019.
Derelöv, Peter, U.S. Appl. No. 16/567,436 entitled "Panels Comprising a Mechanical Locking Device and an Assembled Product Comprising the Panels," filed Sep. 11, 2019.
Fridlund, Magnus, U.S. Appl. No. 16/663,603 entitled "Element and Method for Providing Dismantling Groove," filed Oct. 25, 2019.
Boo, Christian, et al., U.S. Appl. No. 16/697,335 entitled "Panels Comprising a Mechanical Locking Device and an Assembled Product Comprising the Panels," filed Nov. 27, 2019.
U.S. Appl. No. 16/703,077, Fridlund.
U.S. Appl. No. 16/722,096, Derelöv et al.
Fridlund, Magnus, U.S. Appl. No. 16/703,077 entitled "Set of Panels for an Assembled Product," filed Dec. 4, 2019.
Derelöv, Peter, et al., U.S. Appl. No. 16/722,096 entitled "Panels Comprising a Mechanical Locking Device and an Assembled Product Comprising the Panels," filed Dec. 20, 2019.

* cited by examiner

FIG 9

PANELS COMPRISING A MECHANICAL LOCKING DEVICE AND AN ASSEMBLED PRODUCT COMPRISING THE PANELS

TECHNICAL FIELD

The present disclosure relates to panels that may be arranged perpendicular to each other and locked together with a mechanical locking device. The panels may be assembled and locked together to obtain a furniture product, such as a bookshelf, a cupboard, a wardrobe, a box, a drawer or a furniture component. The mechanical locking device may comprise a flexible tongue.

BACKGROUND

A furniture product provided with a mechanical locking device is known in the art, as evidenced by WO 2015/038059. The furniture product comprises a first panel connected perpendicular to a second panel by a mechanical locking device comprising a flexible tongue in an insertion groove.

SUMMARY

One object of certain embodiments of the present disclosure is to provide an improvement over the above described technique and the known art. A specific objective is to improve disassembling of panels, such as furniture panels, locked together by a mechanical locking device. The panels may be a part of a furniture product, such as a furniture component, a drawer, a cupboard, a bookshelf, a wardrobe, a kitchen fixture, and a box.

At least some of these and other objects and advantages that will be apparent from the description have been achieved by a first aspect of the present disclosure that includes a set of panels comprising a first panel having a first main plane and a second panel having a second main plane, wherein the first panel and the second panel comprise a locking device for locking a first edge of the first panel to a second edge of the second panel. The first main plane is essentially perpendicular to the second main plane in locked position of the first panel and the second panel. The locking device comprises an edge groove at the first edge and a tongue groove at the second edge. The edge groove comprises an insertion groove at a first side of the edge groove and a flexible tongue is arranged in the insertion groove. Said flexible tongue is configured to cooperate with the tongue groove for locking together the first edge and the second edge in a first direction, which is perpendicular to the first main plane. Said first side of the edge groove comprises a first groove surface at a first side of the insertion groove and a second groove surface at a second side of the insertion groove. A first side of said second edge comprises a first edge surface at a first side of the tongue groove and a second edge surface at a second side of the tongue groove. The first groove surface and the first edge surface are configured to cooperate for locking the first edge and the second edge in a second direction, which is perpendicular to the second main plane. The second groove surface and the second edge surface are configured to cooperate for locking the first edge and the second edge in the second direction. Said locking device is configured to be unlocked by inserting a tool in the tongue groove. The first groove surface is arranged offset in the second direction relative to the second groove surface by a first distance. This configuration may facilitate disassembling of the first panel and the second panel since the tool may be easier to insert into the tongue groove.

The first edge surface may be arranged offset in the second direction relative to the second surface by a second distance, which is preferably essentially the same as the first distance.

The first distance is in the range of about 0.1 mm to about 0.4 mm. Preferably, the first distance is about 0.2 mm, such as within 10% of 0.2 mm.

The first groove surface and the first edge surface are preferably parallel and may extend parallel to the second main plane.

The second groove surface and the second edge surface are preferably parallel and may extend parallel to the second main plane.

The edge groove may comprise, at a second side that is opposite to the first side, a third groove surface, which is configured to cooperate with a third edge surface of the second edge for locking the first edge and the second edge in the second direction. The third groove surface and the third edge surface are preferably parallel and may extend parallel to the second main plane The first groove surface may be configured to extend partly over the tongue groove. This configuration may have the advantage that a part of the first groove surface which extends over the tongue groove may work as a guiding surface for the tool during an insertion of the tool into the tongue groove. This may also result in a larger tongue groove and a tool with a larger crosscut area. A larger crosscut area may have the effect of a stronger and stiffer tool, which may facilitate the insertion of the tool in the tongue groove.

The first edge surface may be a bottom surface of a recess at the second edge, and is positioned in a locked position of the first panel and the second panel adjacent a first side of an opening of the edge groove. A side surface of the recess may be configured to cooperate with a first main surface of the first panel.

The first edge surface may be at a first main surface of the second panel.

A bottom surface of the edge groove may be configured to cooperate with an outer edge surface of the second edge for locking in the first direction.

The locking device may comprise cooperating surfaces at a second side of the opening of the edge groove, preferably at an outer edge surface at an outer corner of the first panel and at the second panel, respectively, in a locked position.

The locking device may be configured such that a space is obtained between an outer surface of the tool and the first groove surface when the tool is inserted in the tongue groove. A play between the outer surface of the tool and the groove surface is preferably essentially the same as the first distance. For example, the play may be in the range of about 0.1 mm to about 0.4 mm, and may be about 0.2 mm, such as within 10% of 0.2 mm. The outer surface of the tool is preferably inline with the second edge surface when the tool is inserted into the tongue groove. The outer surface of the tool may alternatively be positioned, in the second direction, between the first edge surface and the second edge surface.

The locking device may comprise a bevel or rounding at an opening of the tongue groove. The bevel or rounding may further facilitate disassembling, as the bevel or the rounding may prevent that the flexible tongue from getting stuck during the disassembling, particularly for the case when the play is somewhat too small, such as less than 0.1 mm, due to production tolerances being too large.

A cross section of the tool may have essentially the same shape as a cross section of the tongue groove.

The locking device is preferably configured such that the flexible tongue moves out of the tongue groove when the tool is inserted into the tongue groove, and the flexible tongue is pushed back into the insertion groove.

The edge groove may have a length which is essentially the same as a width of the first panel.

A part of the second edge, which is configured to be inserted into the edge groove, may have a length which is essentially the same as a width of the second panel.

The flexible tongue may be displaceable in the insertion groove.

The first panel and the second panel are preferably configured to be assembled by displacing the first panel relative the second panel in the first direction, wherein the first panel is perpendicular to the second panel. The second edge is inserted into the edge groove, wherein the flexible tongue is pushed back into the insertion groove and springs back into the tongue groove to obtain a locked position of the first panel and the second panel.

The flexible tongue may be designed according to the flexible tongue described and shown in FIGS. 2A-2F of WO2015/105449, which are hereby expressly incorporated by reference herein.

The insertion groove may have a length which is essentially the same as the length of the edge groove.

Some or all features that facilitate unlocking by may be combined in one embodiment to improve the unlocking.

The set of panels may be furniture panels.

A second aspect of the present disclosure includes a set of panels as described above and a tool configured to unlock the locking device by inserting the tool in the tongue groove.

A third aspect of the present disclosure includes an assembled furniture product comprising a corner of a frame comprising the set of panels as described above.

A core material of the first panel and/or the second panel may comprises a wood fibre based board, such as a HDF, MDF, plywood, solid wood or particleboard, or a reinforced plastic board or a wood fibre composite board.

The core may be provided with a decorative layer.

BRIEF DESCRIPTION OF THE DRAWINGS

Embodiments of the present disclosure will by way of example be described in more detail with reference to the appended schematic drawings, in which.

DETAILED DESCRIPTION

Figure 1:
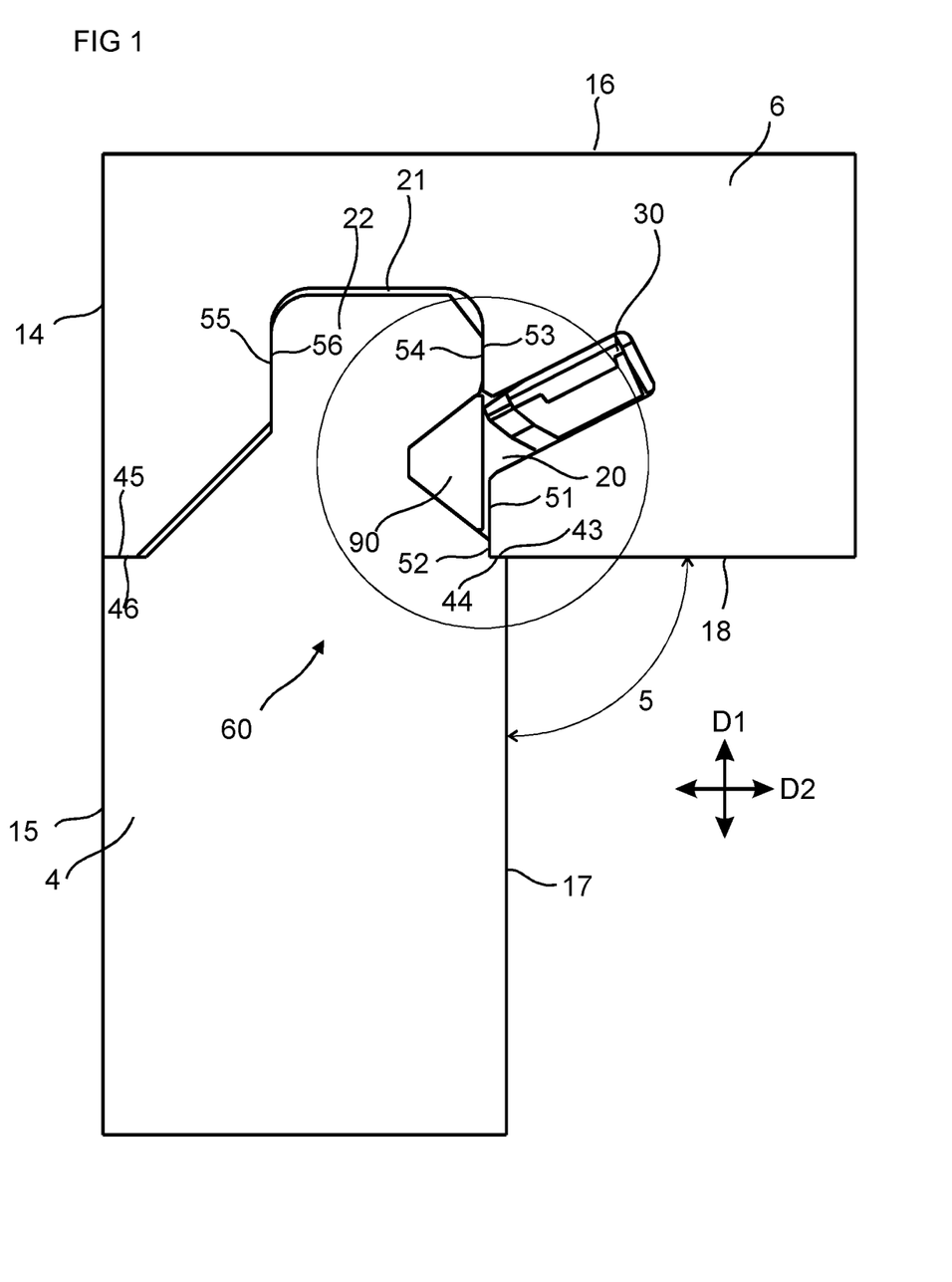
FIG. 1 shows an embodiment comprising the first panel and the second panel during unlocking with an embodiment of the tool inserted into an embodiment of the tongue groove.
Figure 2:
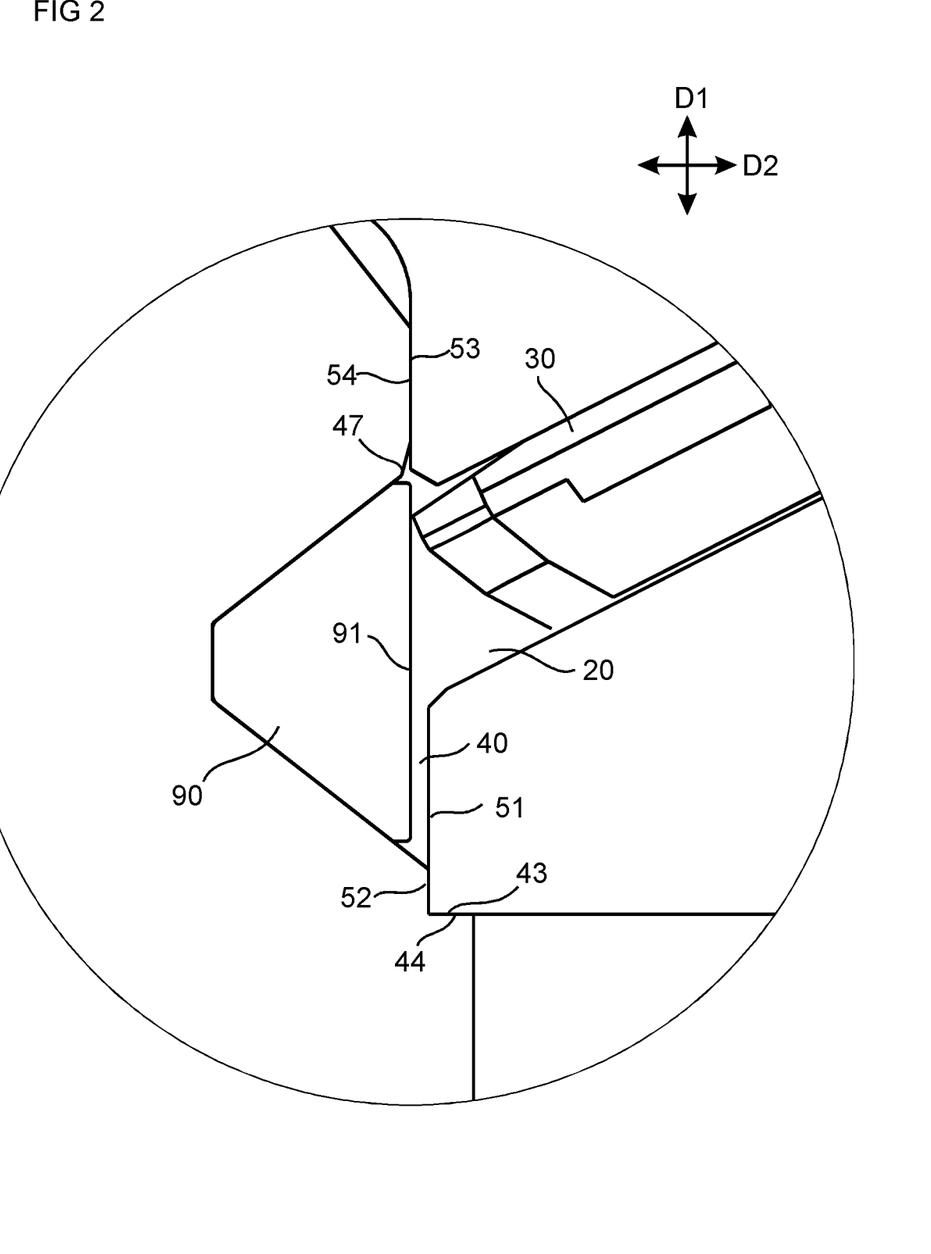
FIG. 2 shows an enlarged view of the encircled area in FIG. 1.

FIG. 1 shows a disassembling of a first panel 6 from a second panel 4. The first panel 6 and the second panel 4 are provided with an embodiment of a locking device 60. The first panel 6 may be a top panel of a frame, such as a frame for a furniture product, and the second panel 4 may be a side panel of the frame. FIG. 2 shows an enlarged view of a part of the locking device 60 in a position during unlocking of the first panel 6 and the second panel 4.

Figure 3A:
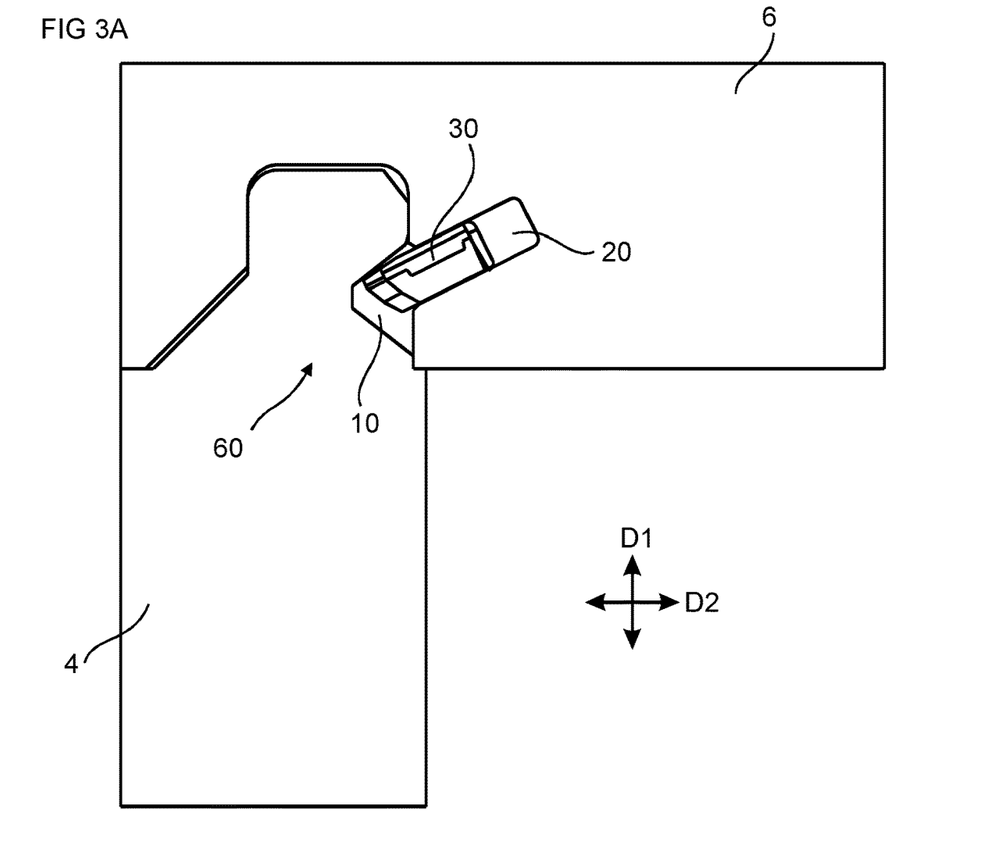
FIG. 3A shows an embodiment comprising the first panel and the second panel in a locked position.

The first panel 6 has a first main plane and second panel 4 has a second main plane. The first main plane is essentially perpendicular to the second main plane. The locking device 60 is configured for locking a first edge of the first panel 6 to a second edge of the second panel 4, as shown in FIG. 3A. The locking device 60 comprises an edge groove 21 at the first edge and a tongue groove 10 at the second edge. The edge groove 21 comprises a flexible tongue 30 arranged in an insertion groove 20 at a first side of the edge groove 21, said flexible tongue is configured to cooperate with the tongue groove 10 for locking together the first edge and the second edge in a first direction D1 which is perpendicular to the first main plane. The first side of the edge groove 21 comprises a first groove surface 51 at a first side of the insertion groove 20 and a second groove surface 53 at a second side of the insertion groove 20, wherein the first groove surface 51 is closer to an opening of the edge groove 21 than the second groove surface 51. A first side of said second edge comprises a first edge surface 52 at a first side of the tongue groove 10 and a second edge surface 54 at a second side of the tongue groove 10. The first groove surface 51 and the first edge surface 52 are configured to cooperate for locking the first edge and the second edge in a second direction D2, which is perpendicular to the second main plane. The second groove surface 53 and the second edge surface 54 are configured to cooperate for locking the first edge and the second edge in the second direction D2.

Said locking device 60 is configured to be unlocked by inserting a tool 90 in the tongue groove 10.

The tool 90 is configured to unlock the locking device 60 by pushing the flexible tongue 30 out of the tongue groove 10 and towards a bottom of the insertion groove 20.

The tool 90 may be of an elongated shape, and FIG. 1 shows a crosscut of such a tool 90.

The first panel 6 and the second panel 4 may be a part of a furniture product, such as a frame. The tongue groove 10 may have an insertion opening at a backside of the furniture product, such that the tool 90 may be inserted in said insertion opening, and the tongue groove 10 may be covered at, or does not extend to, a front side of the furniture product. The insertion groove 20 may be positioned at other parts of the furniture product.

Figure 3B:
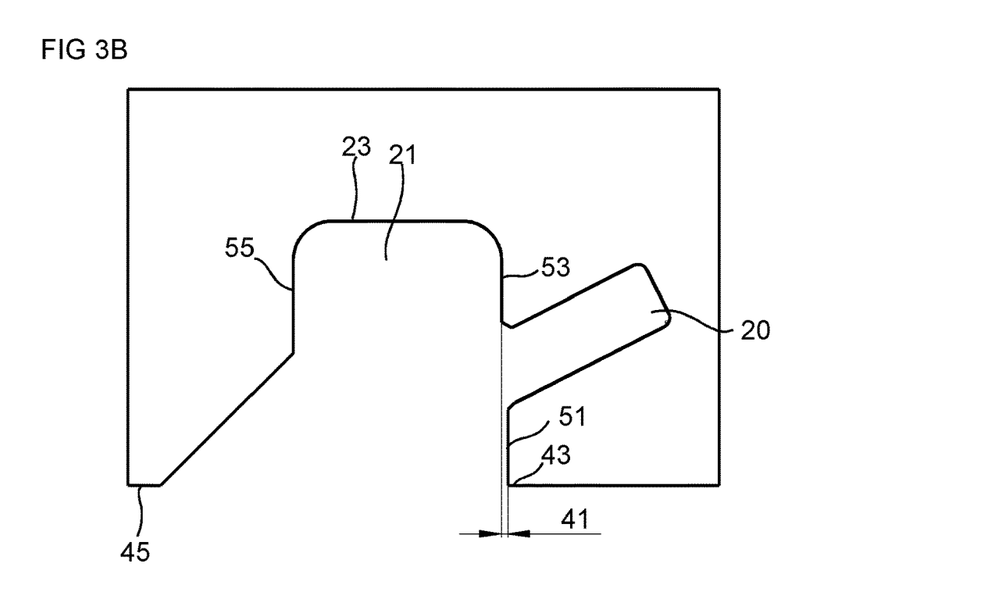
FIG. 3B shows a part of the first panel.

Said first groove surface 51 is arranged offset in the second direction D2 relative to the second groove surface 53 by a first distance 41 (see FIG. 3B). FIG. 2 shows an enlarged view of the encircled area in FIG. 1.

The first groove surface 51 and the first edge surface 52 may be parallel and preferably extend parallel to the second main plane. The second groove surface 53 and the second edge surface 54 may be parallel and preferably extend parallel to the second main plane.

The edge groove 21 may comprise, at a second side that is opposite to the first side, a third groove surface 55, which is configured to cooperate with a third edge surface 56 for locking the first edge and the second edge in the second direction D2.

The locking device 60 may comprise cooperating surfaces 45, 46 at a second side of the opening of the edge groove 21, preferably at an outer edge surface at an outer corner of the first panel and the second panel, respectively, in a locked position of the first panel and the second panel.

The first edge surface 52 may be a bottom surface of a recess 44 at the second edge. In a locked position of the first panel 6 and the second panel 4, the bottom surface is adjacent a first side 43 of an opening of the edge groove 21. A side surface of the recess 44 may be configured to cooperate with a first main surface 18 of the first panel 6.

FIG. 2 shows an embodiment of the first groove surface 51 which extends partly over the tongue groove 10. The locking device 60 is configured such that a play 40 is obtained between an outer surface 91 of the tool 90 and the first groove surface 51 when the tool 90 is inserted in the tongue groove 10. The tool 90 may have essentially the same shape as a cross section of the tongue groove 10. The outer surface of the tool 90 is preferably inline with the second edge surface 54 when the tool 90 is inserted into the tongue groove 10. The outer surface of the tool 90 may alternatively be positioned, in the second direction D2, between the first edge surface 52 and second edge surface 54.

The first panel 6 and the second panel 4 each preferably comprises four edges, a first main surface 18, 17 and a second main surface 16, 15. The first main plane is parallel to the first main surface 18 and the second main surface 16 of the first panel 6, and the second main plane is parallel to the first main surface 17 and the second main surface 15 of the second panel 4. FIG. 1 shows an embodiment wherein the first main surface 17 of the second panel 4 is arranged at an essentially perpendicular angle 5 to the first main surface 18 of the first panel 6. The first main surface 17 of the second panel 4 preferably faces the first main surface 18 of the first panel 6.

The first main surfaces 18, 16 and/or the second main surfaces 17, 15 may comprise a decorative layer (not shown).

The flexible tongue 30 is preferably displaceable in the insertion groove 20. The flexible tongue 30 and the insertion groove 20 may be designed according to the flexible tongue and the groove described and shown in FIGS. 2A-2F in WO2015/105449.

FIG. 3A shows an embodiment of the first panel 6 and the second panel 4 in a locked position. The flexible tongue 30 cooperates with the tongue groove 10 for locking the first panel 6 and the second panel 4 together.

FIG. 3B shows an embodiment of the first edge. The first groove surface 51 is arranged offset in the second direction D2 relative to the second groove surface 53 by a first distance 41. The first distance 41 may be in the range of about 0.1 mm to about 0.4 mm. Preferably, the first distance is about 0.2 mm.

Figure 4A:
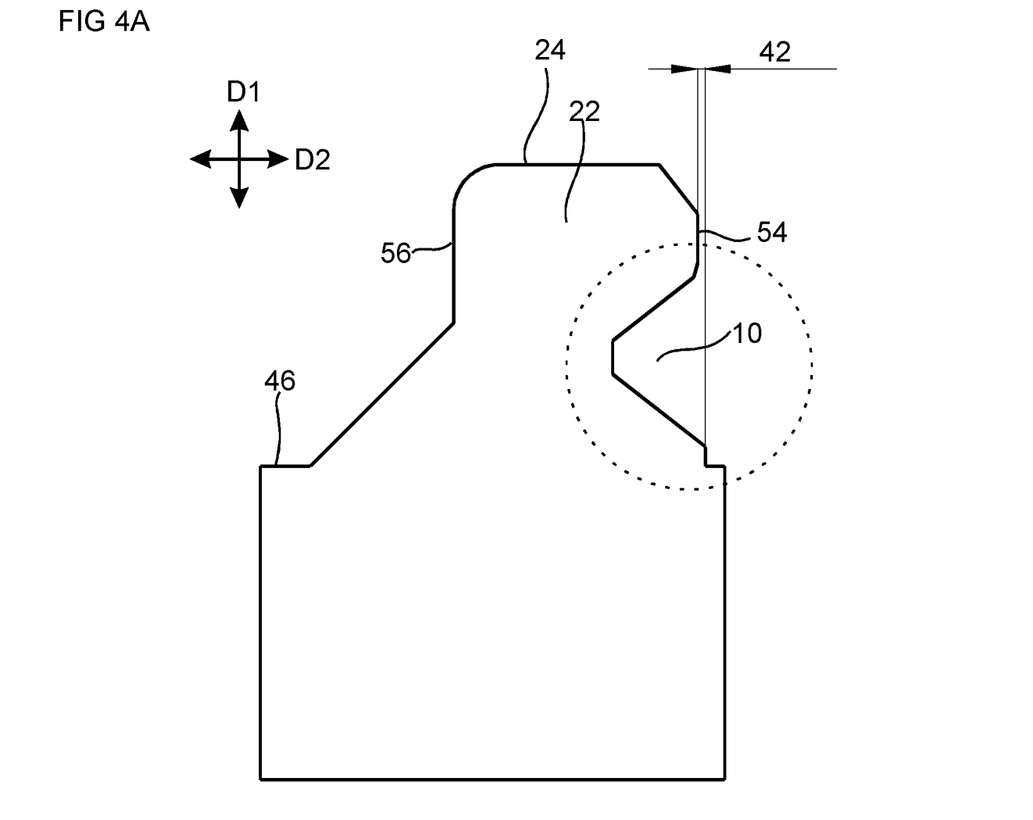
FIG. 4A shows a part of the second panel.

FIG. 4A shows an embodiment of the second edge. The first edge surface 52 is arranged offset in the second direction D2 relative to the second edge surface 54 by a second distance 42. The second distance 42 may be in the range of about 0.1 mm to about 0.4 mm. Preferably, the first distance is about 0.2 mm. The second distance 42 is preferably essentially equal to as the first distance 41. The play 40 shown in FIG. 2 is preferably essentially equal to the first distance 41.

Figure 4B:
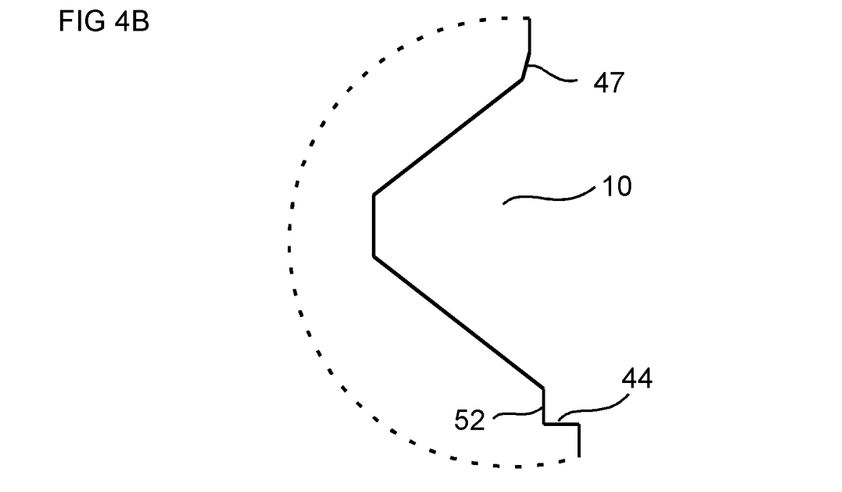
FIG. 4B shows an enlarged view of the encircled area in FIG. 4B.

FIG. 4B shows an enlarged view of the encircled area in FIG. 4A. FIG. 4B shows an embodiment of the locking device 60 comprising a bevel or rounding 47 at an opening of the tongue groove 10.

Figure 5:
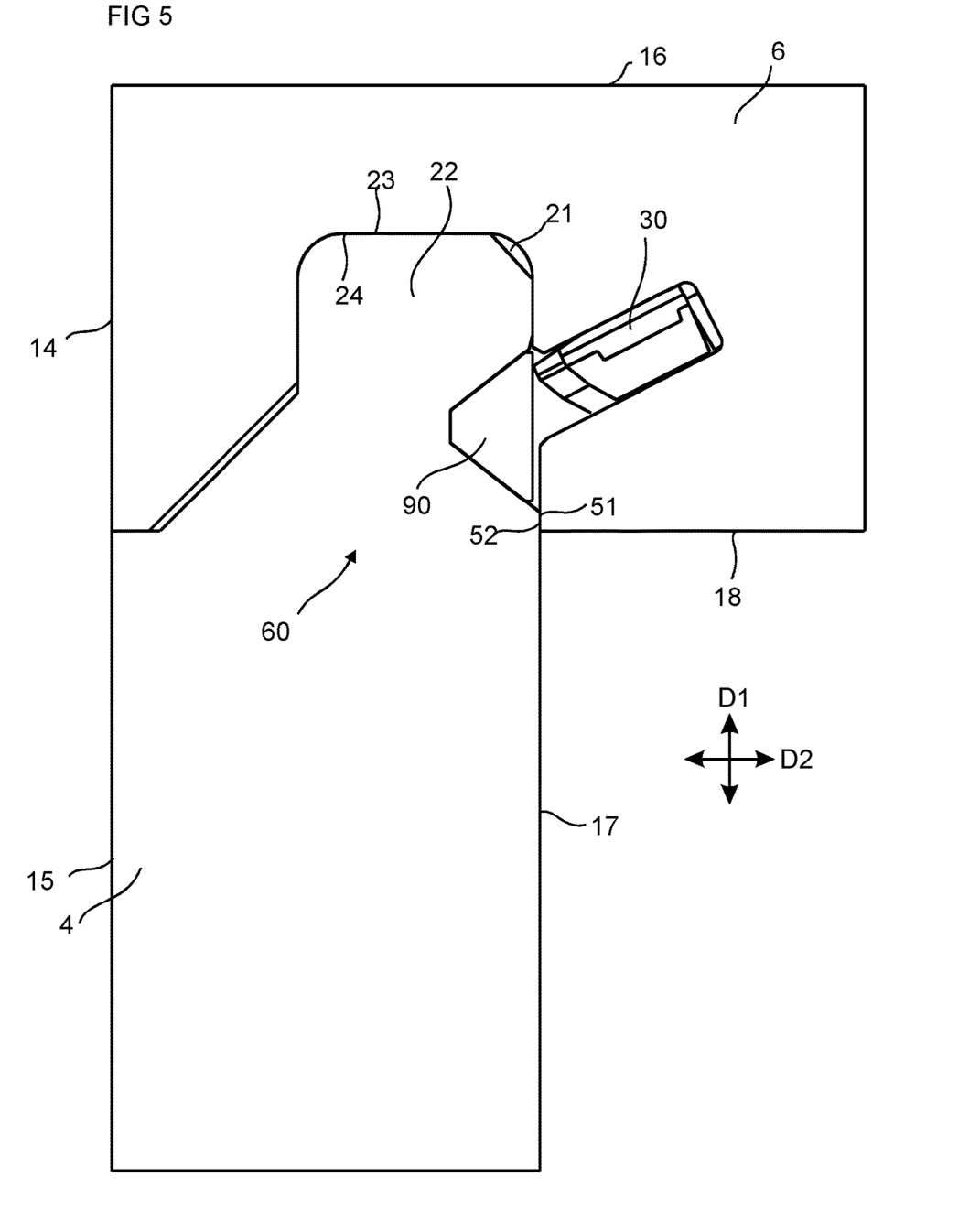
FIG. 5 shows an embodiment comprising the first panel and the second panel during unlocking with an embodiment of the tool inserted into an embodiment of the tongue groove.
Figure 6:
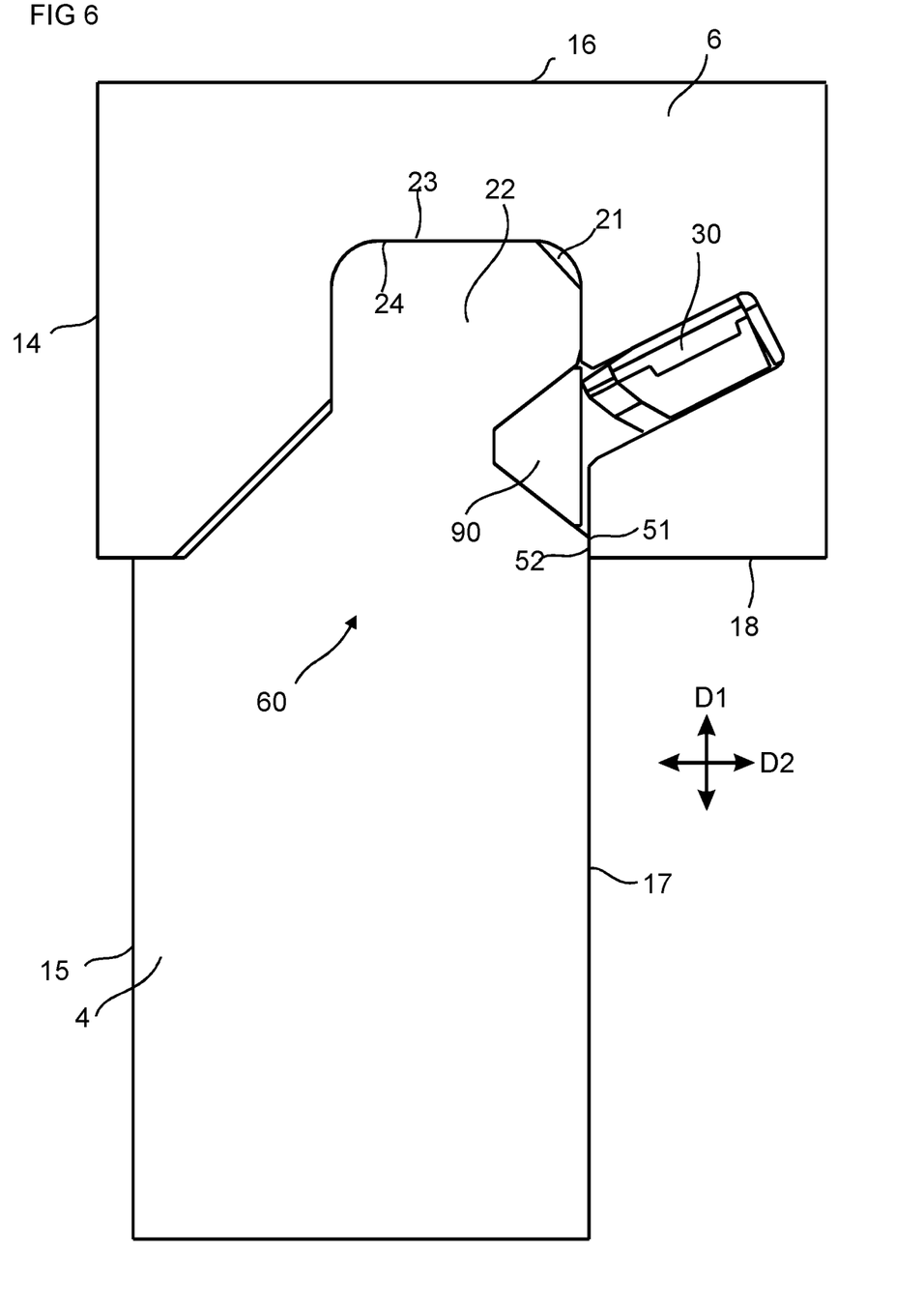
FIG. 6 shows an embodiment comprising the first panel and the second panel during unlocking with an embodiment of the tool inserted into an embodiment of the tongue groove.

FIG. 5 and FIG. 6 show embodiments wherein the first edge surface 52 is at the first main surface 17 of the second panel 4. A bottom surface 23 of the edge groove 21 may be configured to cooperate with an outer edge surface 24 of a portion 22 of the second edge for locking in the first direction D1.

FIG. 6 shows an embodiment comprising a first panel 6 extending beyond the second main surface 15 of the second panel 4. An outer edge 14 of the first panel 6 is positioned at a distance from the second main surface 15 of the second panel 4. This may be an advantage for embodiments in which the first edge surface 52 is a part of a surface that has not been worked. This may have the advantage that there is an overlap between the first panel 6 and the second panel 4, at an outer corner, even in the event that the first panel 6 is too thin, due to production tolerances being too large in the panel production.

Figure 7:
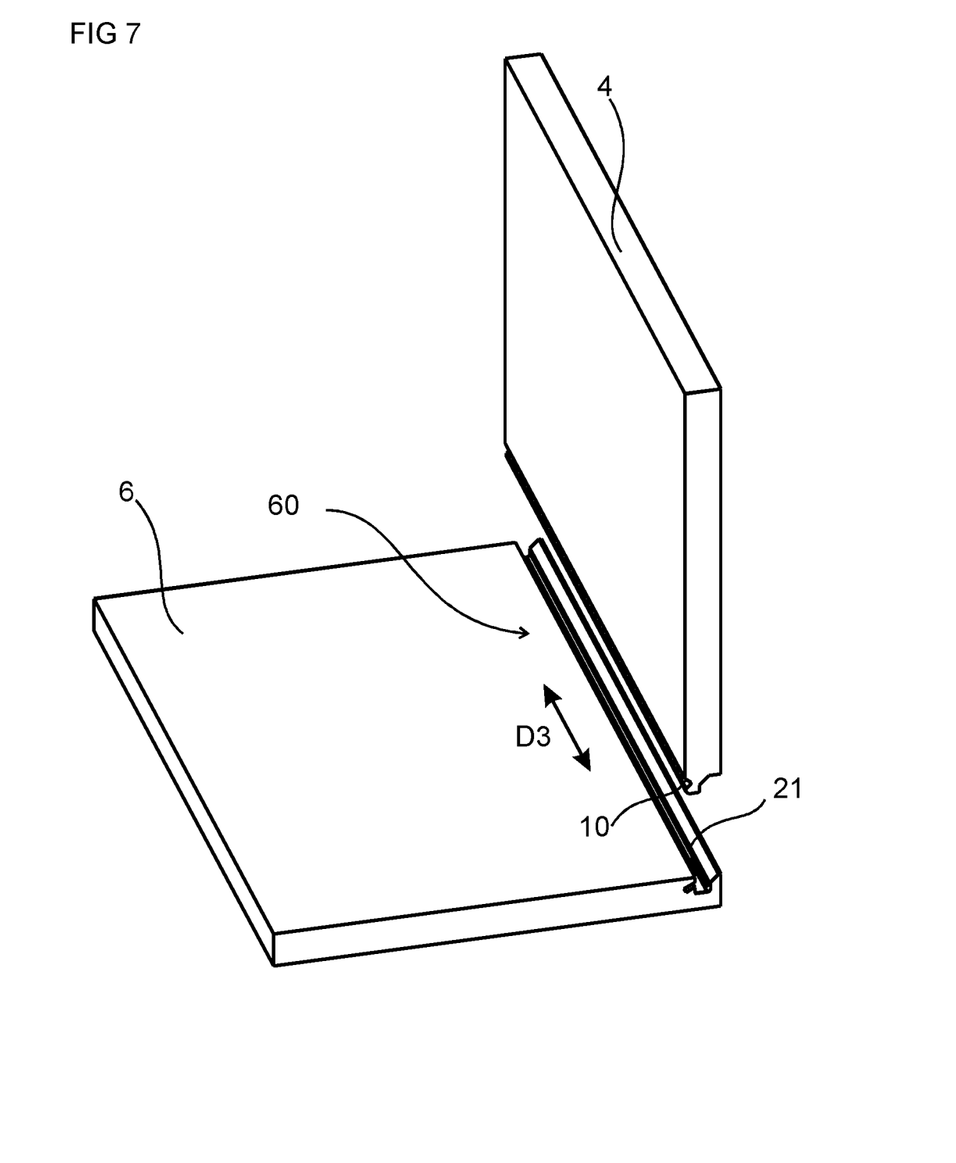
FIG. 7 shows an embodiment comprising the first panel and the second panel in an unlocked position and before assembling.

FIG. 7 shows in a 3D-view an embodiment before the first panel 6 and the second panel 4 are assembled and locked together. The edge groove 21 extends along the first edge of the first panel 6 and in a third direction D3 which is perpendicular to the first direction D1 and the second direction D2. The tongue groove 21 extends along the second edge of the first panel 4.

Figure 8A:
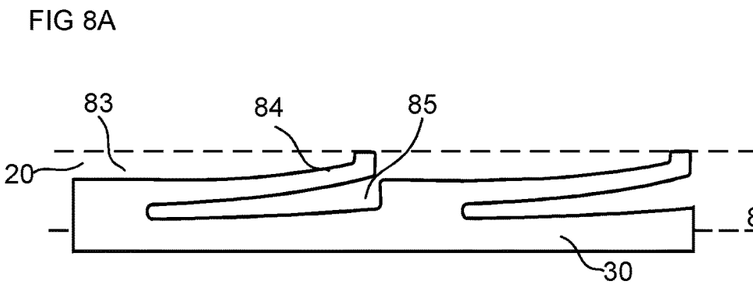
FIGS. 8A-8F show embodiments of the flexible tongue.
Figure 8B:
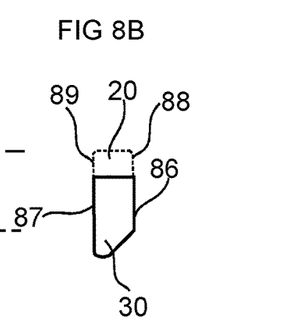
Figure 8C:
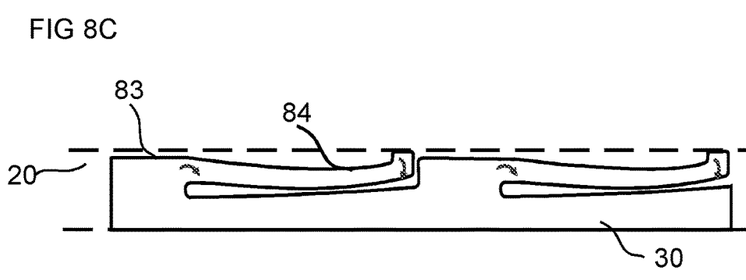
Figure 8D:
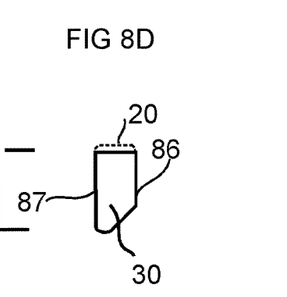

An embodiment of the flexible tongue 30, which is displaceable in an insertion groove 20, is shown in FIGS. 8A-8D. FIGS. 8A-8B show the flexible tongue 30 in a locked position and FIGS. 8C-8D show the flexible tongue 30 during assembling of the first panel 6 and the second panel 4. FIG. 8B shows a cross section of the flexible tongue 30 illustrated in FIG. 8A. FIG. 8D shows a cross section of the flexile tongue 30 illustrated in FIG. 8C. The flexible tongue 30 comprises bendable protruding parts 84. A space 83 is provided between the flexible tongue 30 and a bottom wall of the insertion groove 20. FIG. 8C shows that the flexible tongue 30 is pushed into the insertion groove 20 and towards the bottom wall of the insertion groove 20 during an assembly of the first panel 6 with the second panel 4. The flexible tongue 30 springs back toward its initial position when the first panel 6 and the second panel 4 have reached a locked position. A recess 85 is preferably arranged at each bendable protruding part 84.

The flexible tongue 30 may have a first displacement surface 86 and an opposite second displacement surface 87, configured to be displaced along a third displacement surface 88 and a fourth displacement locking surface 89, respectively, of the insertion groove 20.

Figure 8E:
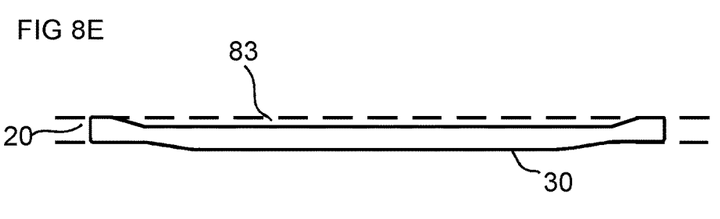
Figure 8F:
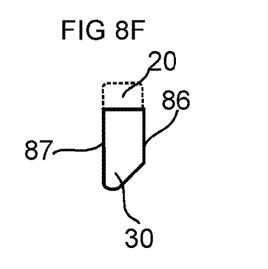

An alternative embodiment of the flexible tongue 30, without the protruding bendable parts 84, is shown in FIGS. 8E-8F. FIG. 8F shows a cross section of the flexible tongue 30 shown in FIG. 8E. The alternative embodiment is bendable in its length direction in order to accomplish the same function as the embodiment shown in FIGS. 8A-8D.

Figure 9:
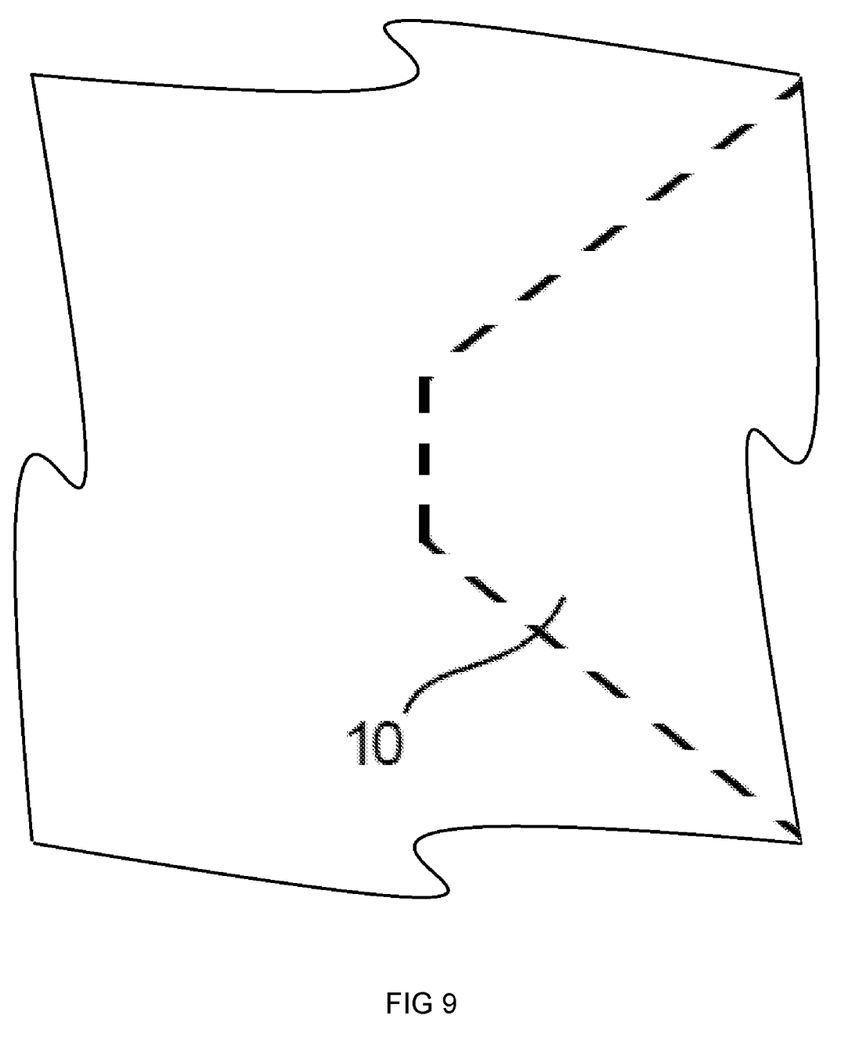
FIG. 9 shows an embodiment of a section of a front portion of a furniture product.

FIG. 9 shows an embodiment of a section of a front portion of a furniture product, wherein the tongue groove 10 is covered at the front side of the furniture product and/or does not extend to the front side of the furniture product.

The set of panels described above may be a part of a furniture product, such as a frame.

A core material of the panels in the embodiments above preferably comprises a wood fibre based board, such as a HDF, MDF, plywood, solid wood or particleboard, a reinforced plastic board, or a wood fibre composite board.

The invention claimed is:

1. A furniture product comprising a first panel having a first main plane and a second panel having a second main plane at a corner of the furniture product, wherein the first panel and the second panel comprise a locking device for locking a first edge of the first panel to a second edge of the second panel, wherein the first main plane is essentially perpendicular to the second main plane in a locked position of the first panel and the second panel, the locking device comprising an edge groove at the first edge and a tongue groove at the second edge, the edge groove comprising an insertion groove at a first side of the edge groove, wherein the insertion groove comprises a flexible tongue which is configured to cooperate with the tongue groove for locking together the first edge and the second edge in a first direction which is perpendicular to the first main plane, said first side of the edge groove comprising a first groove surface at a first side of the insertion groove and a second groove surface at a second side of the insertion groove, and a first side of said second edge comprising a first edge surface at a first side of the tongue groove and a second edge surface at a second side of the tongue groove, wherein the first groove surface and the first edge surface are configured to cooperate for locking the first edge and the second edge in a second direction, which is perpendicular to the second main plane, wherein the second groove surface and the second edge surface are configured to cooperate for locking the first edge and the second edge in the second direction, said locking device is configured to be unlocked by inserting a tool in the tongue groove, wherein the first groove surface is arranged offset in the second direction relative to the second groove surface by a first distance.

2. The furniture product as claimed in claim 1, wherein the tongue groove includes an insertion opening at a backside of the furniture product, such that the tool may be inserted in said insertion opening, the backside of the furniture product including a surface perpendicular to the first and second main planes.

3. The furniture product as claimed in claim 2, wherein the tongue groove is covered at a front side of the furniture product opposite the backside.

4. The furniture product as claimed in claim 2, wherein the tongue groove does not extend to a front side of the furniture product opposite the backside.

* * * * *